(12) United States Patent
Buskmiller et al.

(10) Patent No.: US 8,270,572 B2
(45) Date of Patent: Sep. 18, 2012

(54) SYSTEM AND METHOD OF DETERMINING LATENT FAILURES IN TELEPHONE WIRE-PAIR POWER DISTRIBUTION

(75) Inventors: Michael R. Buskmiller, Dallas, TX (US); Roy J. Davis, Rowlett, TX (US); Edward C. Fontana, Rockwall, TX (US); Mark A. Johnson, Plano, TX (US)

(73) Assignee: Lineage Power Corporation, Plano, TX (US)

( * ) Notice: Subject to any disclaimer, the term of this patent is extended or adjusted under 35 U.S.C. 154(b) by 1411 days.

(21) Appl. No.: 11/532,432

(22) Filed: Sep. 15, 2006

(65) Prior Publication Data
US 2007/0121795 A1    May 31, 2007

Related U.S. Application Data

(60) Provisional application No. 60/717,370, filed on Sep. 15, 2005.

(51) Int. Cl.
*H04M 1/24* (2006.01)
*H04M 3/08* (2006.01)
*H04M 3/22* (2006.01)

(52) U.S. Cl. .......... 379/24; 379/12; 379/22; 379/29.01; 379/29.05

(58) Field of Classification Search .............. 379/1.01, 379/12, 22, 22.02, 22.03, 22.07, 23, 24, 27.01, 379/27.03, 29.04, 29.05, 30, 29.01; 324/512, 514, 515, 522, 523, 525, 527, 539, 543, 754, 757

See application file for complete search history.

(56) References Cited

U.S. PATENT DOCUMENTS

| | | | |
|---|---|---|---|
| 5,642,412 A * | 6/1997 | Reymond | 379/348 |
| 5,956,386 A * | 9/1999 | Miller | 379/27.02 |
| 6,169,785 B1 * | 1/2001 | Okazaki | 379/27.01 |
| 6,658,108 B1 * | 12/2003 | Bissell et al. | 379/413 |
| 6,812,712 B2 * | 11/2004 | Linzey | 324/541 |
| 7,773,744 B1 * | 8/2010 | Joffe | 379/412 |
| 2005/0220021 A1 * | 10/2005 | Sosnowski et al. | 370/235 |
| 2006/0022650 A1 * | 2/2006 | Vinciarelli | 323/266 |
| 2009/0257580 A1 * | 10/2009 | Nattkemper et al. | 379/413 |

* cited by examiner

*Primary Examiner* — Binh Tieu

(57) ABSTRACT

The present invention provides a wiring degradation detector for use with telephone wire-pairs providing electric power. In one embodiment, the wiring degradation detector includes a transmission section configured to transmit load power over the telephone wire-pairs. Additionally, the wiring degradation detector also includes a test section coupled to the transmission section and configured to provide a load power test signal that determines a condition of the telephone wire-pairs. In an alternative embodiment, the wiring degradation detector further includes a degradation monitoring section coupled to the test section and configured to track values of the condition of the wiring over time.

20 Claims, 6 Drawing Sheets

SYSTEM AND METHOD OF DETERMINING LATENT FAILURES IN TELEPHONE WIRE-PAIR POWER DISTRIBUTION

CROSS-REFERENCE TO PROVISIONAL APPLICATION

This application claims the benefit of U.S. Provisional Application No. 60/717,370 entitled "System and Method of Eliminating Latent Failures in Telephone Pair Power Distribution Wiring" to Michael R. Buskmiller, Roy J. Davis, Edward C. Fontana and Mark A. Johnson, filed on Sep. 15, 2005, which is incorporated herein by reference in its entirety.

TECHNICAL FIELD OF THE INVENTION

The present invention is directed, in general, to telecommunications power systems and, more specifically, to a wiring degradation detector, a method of detecting wiring degradation and a power distribution system that employ telephone wire-pairs to provide electric power.

BACKGROUND OF THE INVENTION

Telephone service providers are committed to providing high data rate services to customers. This requires the location of power consuming equipment near the customer-end and necessarily outside of the battery-backed Central Office environment. One way to deliver power to remote sites without interruptions is to use uninterruptible power delivered from the Central Office at elevated voltages over several pairs of telephone lines that are configured in parallel.

This approach allows accommodation of battery maintenance, efficiency and issues involving "reach" but leaves the power distribution susceptible to latent failures since a portion of the parallel wiring may be lost with no clear indication to network managers. In these cases, the conductor or insulation may degrade or fail open on one or more of the wires that are paralleled to deliver the remote power. It is advantageous to detect this failure quickly to maintain delivery performance.

In a remote power circuit that uses two or more telephone wiring pairs, the failure of one wire would typically produce a measurable increase in transmission resistance associated with power transmission. However, in other situations, there are large regions of operation where even significant changes in conductor resistance may produce only small measurable changes in source current since the dependence of source current on line resistance is weak. To make this more troublesome, the field environment where these current measurements must be taken is often rich in electrical noise, and a measurement converter used is typically not as accurate as a laboratory quality measurement or meter. Additionally, the load may have some traffic dependence that will contribute to changes in current that is normal.

In a typical high-reliability installation, the downstream power converter will be provided with redundant power, such that a load will not suffer if one power feed is delivering slightly less than before. Yet, degradation of insulation or wiring or failure of a single wire or wiring pair may remove redundant power without providing any warning. This latent failure is unacceptable to any service provider who counts downtime in minutes per year.

Accordingly, what is needed in the art is an enhanced way to determine latent or actual failures of telephone wiring pairs employed for power distribution.

SUMMARY OF THE INVENTION

To address the above-discussed deficiencies of the prior art, the present invention provides a wiring degradation detector for use with telephone wire-pairs providing electric power. In one embodiment, the wiring degradation detector includes a transmission section configured to transmit load power over the telephone wire-pairs. Additionally, the wiring degradation detector also includes a test section coupled to the transmission section and configured to provide a load power test signal that determines a condition of the telephone wire-pairs. In an alternative embodiment, the wiring degradation detector further includes a degradation monitoring section coupled to the test section and configured to track values of the condition over time.

In another aspect, the present invention provides a method of detecting wiring degradation for use with telephone wire-pairs providing electric power. The method includes transmitting load power over the telephone wire-pairs and providing a load power test signal that determines a condition of the telephone wire-pairs. Additionally, the method further includes tracking values of the condition over time.

The present invention also provides, in yet another aspect, a power distribution system. The power distribution system includes an upstream power converter coupled to a power source, and a wiring degradation detector coupled to the upstream power converter. The wiring degradation detector has a transmission section that transmits load power over telephone wire-pairs and a test section, coupled to the transmission section, that provides a load power test signal for determining a condition of the telephone wire-pairs. The wiring degradation detector also has a degradation monitoring section coupled to the test section that tracks values of the condition over time. The power distribution system also includes a downstream power converter coupled to the wiring degradation detector, and a load coupled to the downstream power converter.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Embodiments of the present invention provide a determination of the robustness of alternative approaches for detecting and monitoring latent failures in telephone pair power distribution wiring. Multiple telephone wire-pairs are deployed to reduce distribution losses in the network. This can be done to either extend reach or increase the power delivered using a limited number of power-limited circuits.

In one embodiment, a sourced current deviation from other circuits serving a particular node is employed. In an alternative embodiment, an indirect determination of wire resistance is provided by measuring change in source current at a reduced source voltage. When operating around the region of interest, both embodiments provide signal to noise levels consistent with measurement by an inexpensive eight bit analog to digital converter (ADC) deployed at the source end of a transmission network.

The sourced current deviation from peers behaves in an easily understandable way in that it shows that "one of these is not like the others" allowing deviation from a norm to provide a ready reference for gauging response. For indirect determination of resistance, a 10 percent drop in source voltage may be seen to provide an advantageous response.

Figure 1:
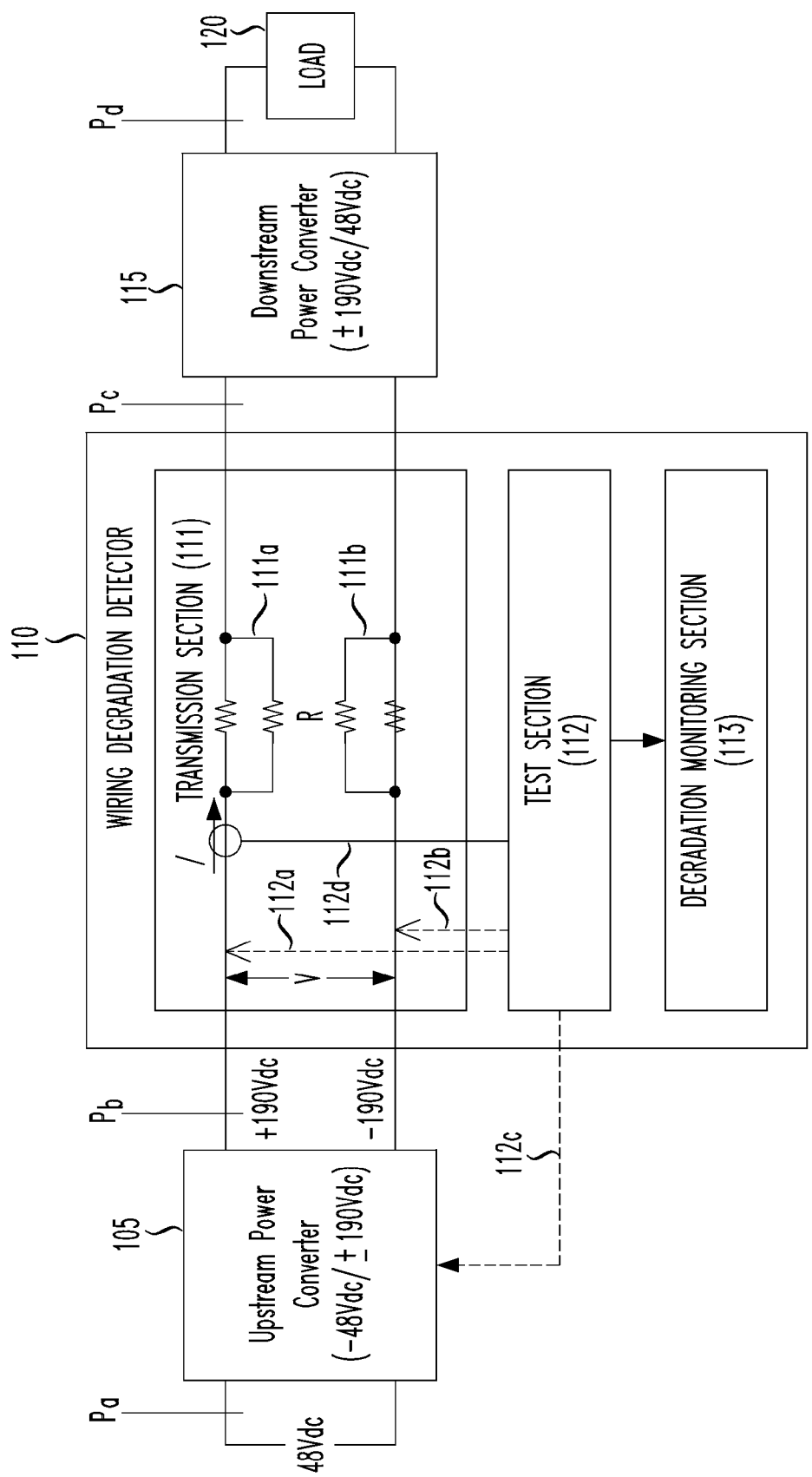
FIG. 1 illustrates a system diagram of an embodiment of a power distribution network constructed in accordance with the principles of the present invention.

Referring initially to FIG. 1, illustrated is a system diagram of an embodiment of a power distribution network, generally designated 100, constructed in accordance with the principles of the present invention. The power distribution network 100 includes an upstream power converter 105 coupled to a 48 volt DC voltage source, a wiring degradation detector 110, a downstream power converter 115 and a load 120. The upstream power converter 105 converts the 48 volt DC source voltage to positive and negative DC voltages having nominal magnitudes of 190 volts that are coupled through the wiring degradation detector 110 to the downstream power converter 115. The downstream power converter 115 converts the coupled positive and negative 190 volt DC voltages to 48 volts for application to the load 120.

The wiring degradation detector 110 includes a transmission section 111, a test section 112 and a degradation monitoring section 113. The transmission section 111 is configured to transmit load power over a plurality of telephone pairs 111a, 111b. The transmission section 111 employs copper pairs for power distribution, where a transmission resistance R is the equivalent resistance of all operational distribution wiring. The test section 112 is coupled to the transmission section 111 and configured to provide a load power test signal to determine a condition of the plurality of telephone pairs 111a, 111b. This condition may be correlated to their transmission wiring degradation.

The load power test signal is applied to the plurality of telephone pairs 111a, 111b. In one embodiment, test probes 112a, 112b are used respectively to provide a source perturbation directly to the plurality of telephone pairs 111a, 111b. In an alternative embodiment, a perturbation control signal 112c enables an already existing capability of the upstream power converter 105 to provide the source perturbation to the plurality of telephone pairs 111a, 111b. Herein, source perturbation is used to indicate a deviation in the source from its regular value that is caused by a secondary influence. A current measurement probe 112d is employed to measure a transmission current I, as shown. The degradation monitoring section 113 is coupled to the test section 112 and configured to monitor the transmission wiring degradation over time based on the conditions produced by a set of load power test signals.

Reference surfaces for power transfer are labeled $P_a$, $P_b$, $P_c$, and $P_d$ from left to right, respectively, as shown in FIG. 1. If the power consumed after location $P_c$ is substantially constant, an energy conservation equation may be written as:

$$P_b = P_c + I^2(R), \quad (1)$$

where $P_b = IV$, which is the product of the transmission current I and an input voltage V to the transmission section 111. This may be arranged into a quadratic equation:

$$RI^2 - VI + P_c = 0, \quad (2)$$

where the traditional coefficients a, b, and c are seen to be R, $-V$, and $P_c$, respectively. The solution set to this quadratic equation is shown as a family of curves in FIG. 2 for a value of V equal to 395 volts.

Figure 2:
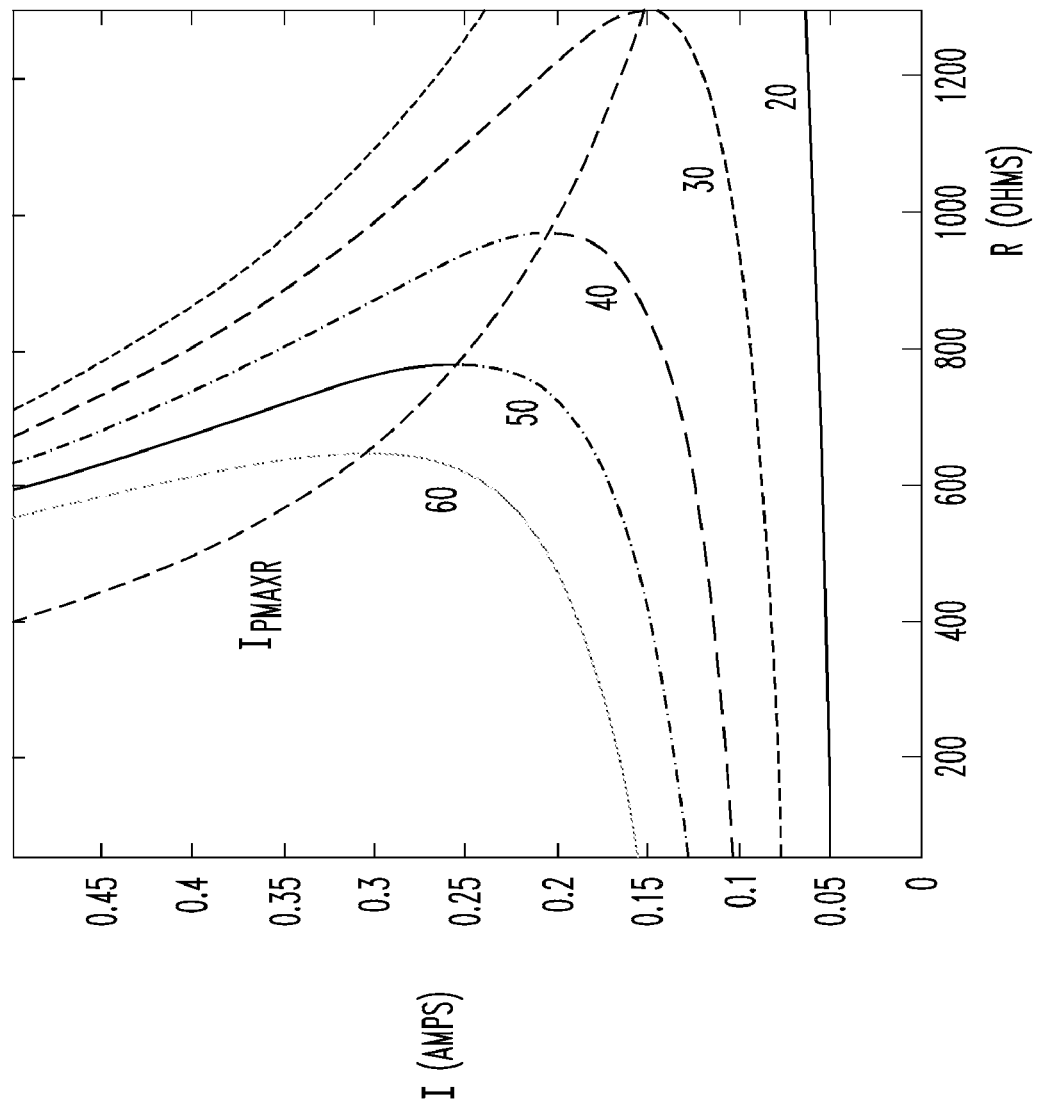
FIG. 2 illustrates a graph showing constant delivered power curves which illustrate a generalized or theoretical behavior for the power distribution network of FIG. 1.

Turning now to FIG. 2, illustrated is a graph showing constant delivered power curves, generally designated 200, which illustrate a generalized or theoretical behavior for the power distribution network of FIG. 1. In FIG. 2, the constant delivered power curves 200 show loci of constant power consumption labeled as 20, 30, 40, 50 and 60 watts for location $P_c$ of FIG. 1, above. Another locus of note is a line $I_{PMAXR}$ indicating the maximum reach or resistance that is allowed for a particular power at the receiving end ($P_D$). The equation for the line $I_{PMAXR}$ is:

$$I_{PMAXR} = V/2R. \quad (3)$$

Figure 3:
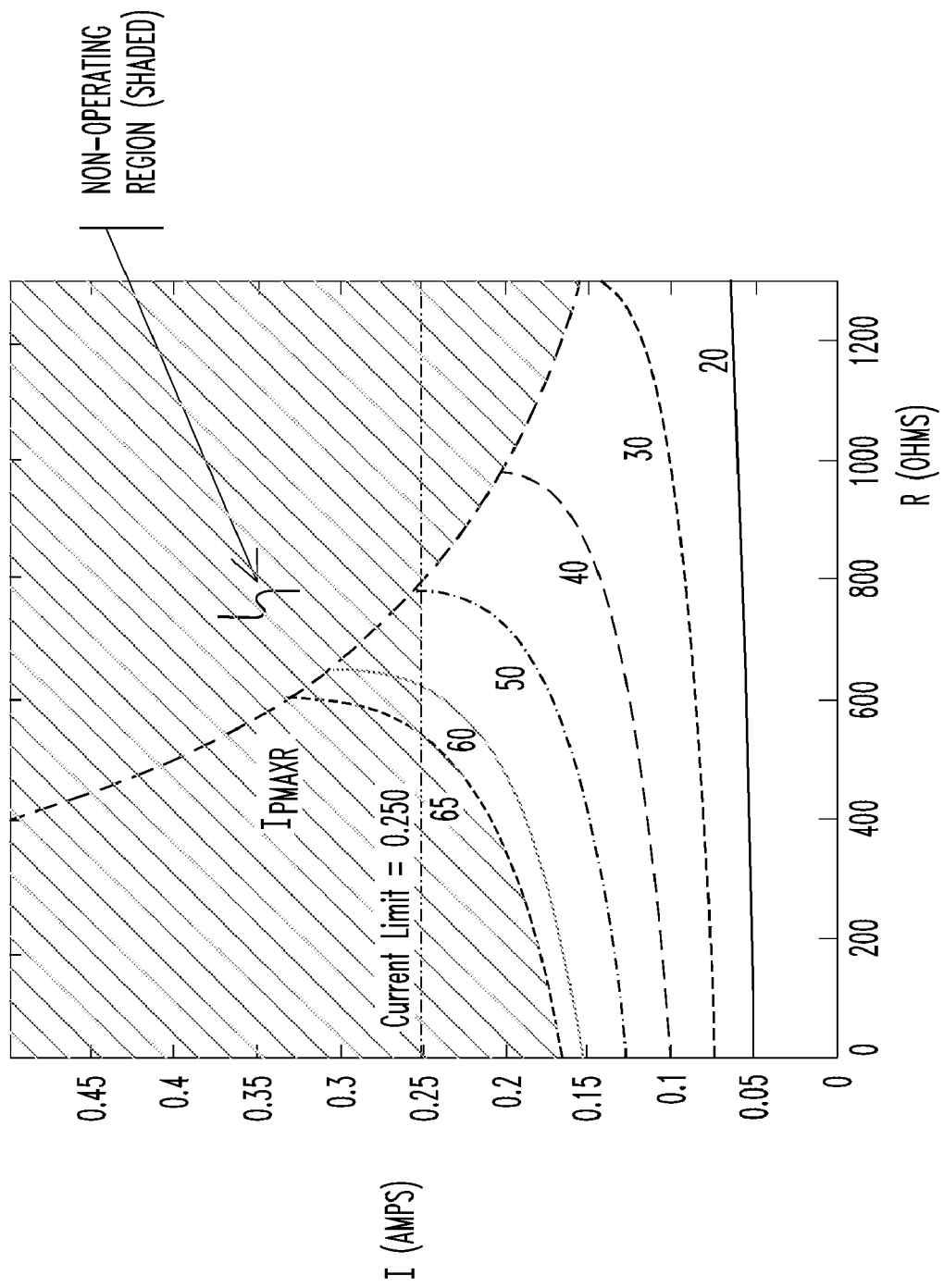
FIG. 3 illustrates a graph showing constant delivered power curves depicting an exemplary area of actual operation for the power distribution network 100 of FIG. 1.

Turning now to FIG. 3, illustrated is a graph showing constant delivered power curves, generally designated 300, depicting an exemplary area of actual operation for the power distribution network 100 of FIG. 1. In the illustrated embodiment, the source power for the envelope of actual operation is limited to 100 watts for safety reasons. Since the source maximum voltage limit is 400 volts, the resulting source current limit is therefore set at 0.25 amperes.

FIG. 3 shows the 0.25 ampere maximum current limit and the maximum deliverable power thresholds for each of the constant delivered power curves. Dashed hash marks indicate a region that is a non-operating region for the example given. The vertical axis of FIGS. 2 and 3 may also be considered to be sourced power as well as sourced current, since the voltage at the source is a constant 395 volts nominal for all conditions. The increasing slope at the right-hand end of the constant delivered power curves shows the increasing fraction of sourced energy being dissipated in the wiring for each incremental increase in resistance in this region.

Returning again to FIG. 1, an exemplary operation of the power distribution network 100 employing multiple telephone pairs to extend reach is considered. A transmission resistance R of 472.6 ohms corresponds to two 26 gage, parallel-coupled telephone wire-pairs having a one-way distance of 10,740 feet wherein a power of 53.5 watts is consumed by the load 120. The wiring degradation detector 110 may be employed to detect failures of one wire or a pair of wires as well as wire degradation over time. These conditions correspond to a resistance change from 472.6 ohms to 708 ohms for a one-wire failure and to 945.2 ohms for a failure involving a pair of wires. Wire degradation provides resistance values that are intermediate to these values.

In the illustrated embodiment, the test section 112 employs a resolution of eight bits wherein each of the 256 levels represents one milliampere of source current for the source current limit of 250 milliamperes. As may be seen from FIGS. 2 and 3, there are regions where significant changes in wire resistance produce minimal measurable change in source current. Additionally, the operational environment contains electrical noise influences that make an expectation of lab quality measurements unrealistic.

In one embodiment, the test section 112 employs a load power test signal that provides a source current deviation from the group of circuits serving a given node in detecting wire degradation. In an alternative embodiment, the load power test signal provides a source voltage deviation that allows a single-ended resistance measurement of a particular circuit.

Figure 4:
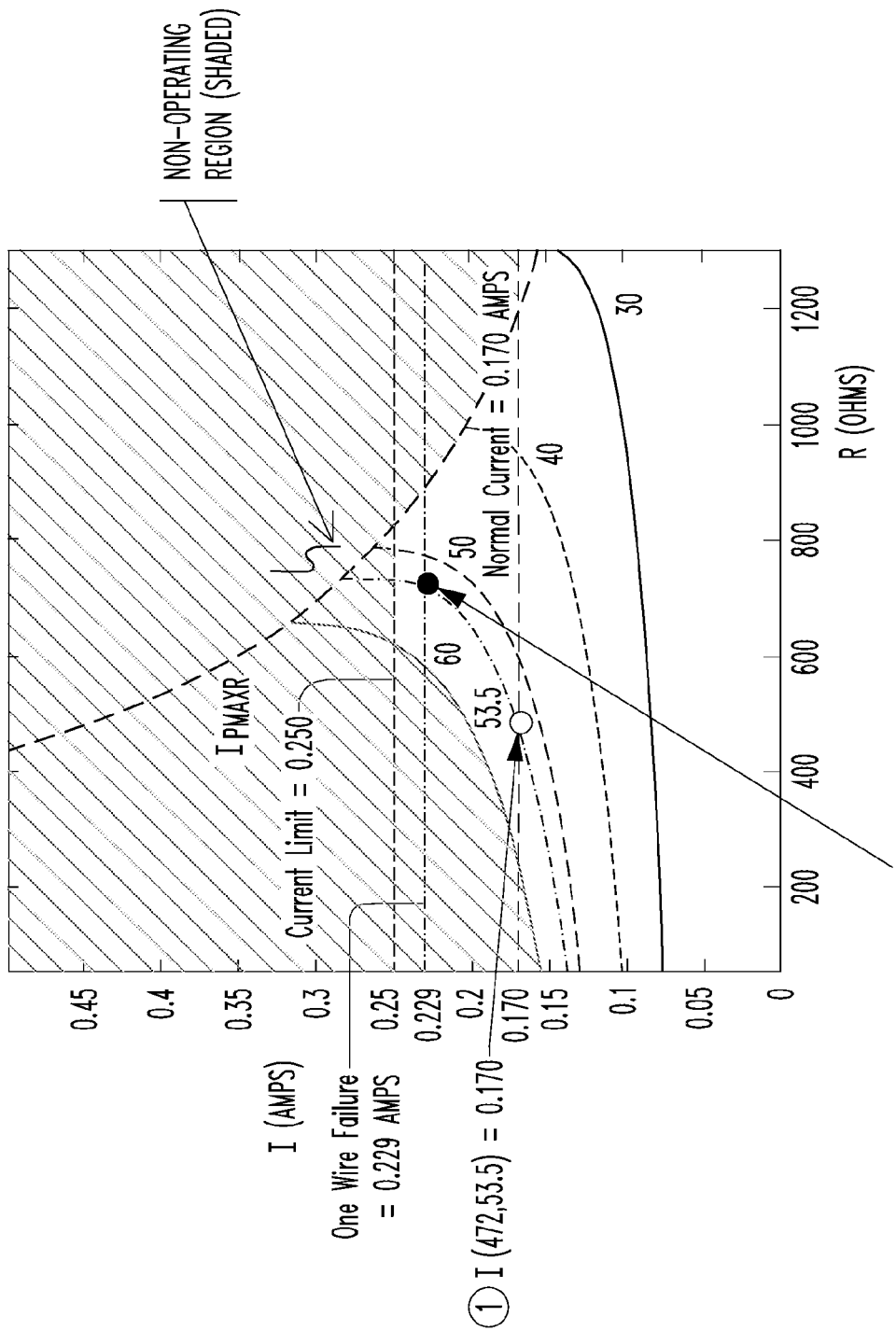
FIG. 4 illustrates a graph of constant delivered power curves showing exemplary transmission wiring degradation employing a load power test signal embodying source current perturbation testing.

Turning now to FIG. 4, illustrated is a graph of constant delivered power curves, generally designated 400, showing exemplary transmission wiring degradation employing a load power test signal that embodies source current perturbation testing. The constant delivered power curves 400 include a curve corresponding to a load power of 53.5 watts, as discussed earlier.

Since power sharing is independent of source voltage or impedance until current limit is reached, all other circuits (telephone wire-pairs) serving a particular node maintain a transmission current I of approximately 170 milliamperes as may be seen in FIG. 4 at a first operating point 1. This transmission current I corresponds to a transmission resistance R of about 472 ohms for the load power of 53.5 watts. However, the circuit in question draws a greater transmission current I, which corresponds to movement along the locus of the constant delivered power curve of 53.5 watts, as shown.

At a second operating point 2, a transmission current of 229 milliamperes corresponds to a failure of one wire of the two 26 gage, parallel-coupled telephone wire-pairs thereby providing a transmission resistance R of about 708 ohms for the load power of 53.5 watts. Failure of one telephone wire-pair would invoke a current limit condition wherein the other circuits would begin sourcing more current. If wire degradation were occurring slowly over time, the circuit at fault would creep up to current limit.

Figure 5:
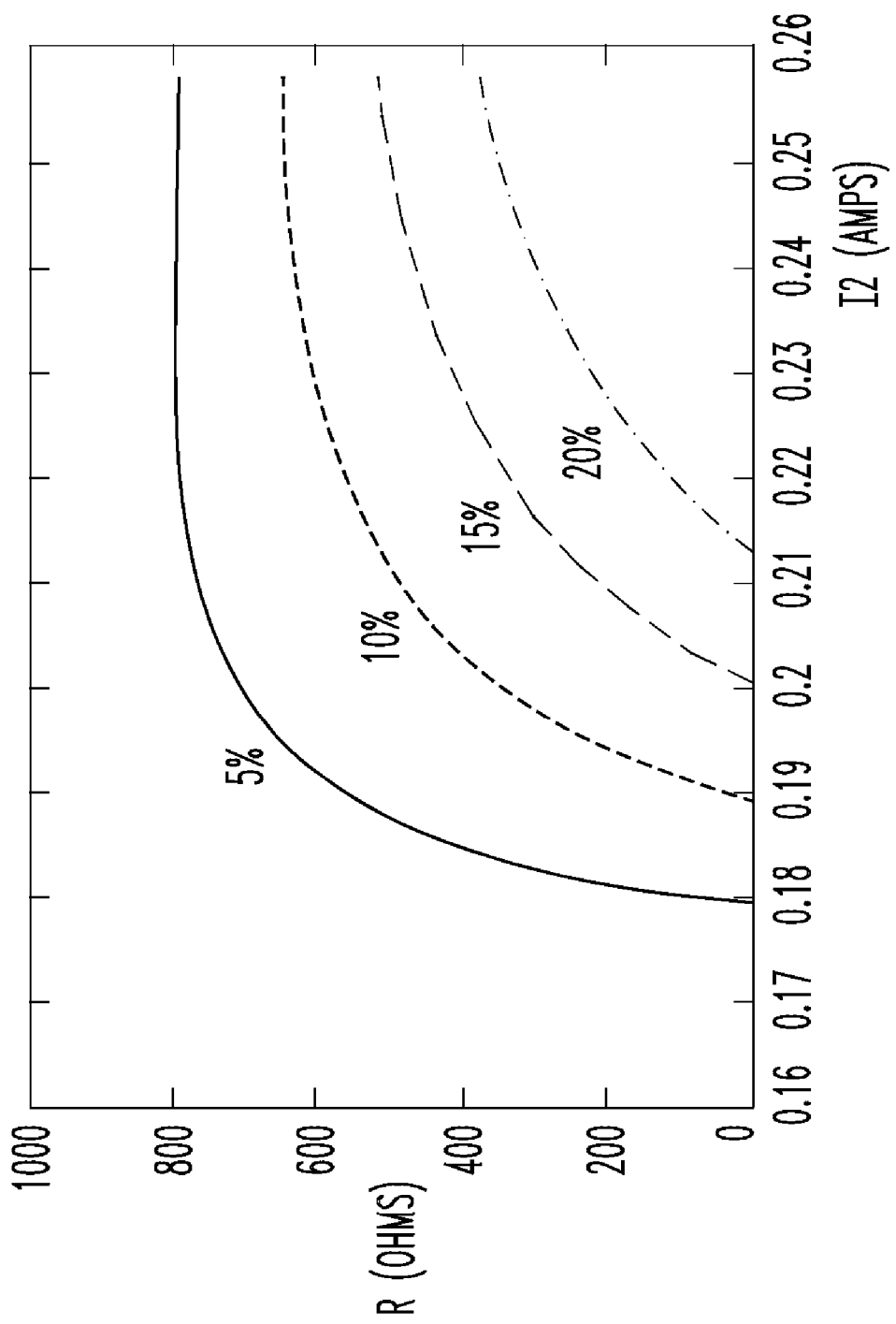
FIG. 5 illustrates a graph of indirect resistance measurement curves employing a load power test signal that embodies a source voltage perturbation for a set of different source voltage perturbations.

Turning now to FIG. 5, illustrated is a graph of indirect resistance measurement curves, generally designated 500, employing a load power test signal embodying a source voltage pertubation for a set of different source voltage perturbations. The indirect resistance measurement curves 500 measure transmission resistance R relying on the insensitivity of load power consumed to changes in input voltage and impedance.

A transmission resistance R may be determined by:

$$R(I_2) = \frac{(V_2 I_2 - V_1 I_1)}{I_2^2 - I_1^2}, \quad (4)$$

where $V_1$ is the initial source voltage, $V_2$ is the reduced source voltage imposed for measurement purposes, $I_1$, is the operating current drawn from the source at the initial source voltage $V_1$ and $I_2$ is the operating current drawn from the source at the reduced source voltage $V_2$.

Equation (4) may be modified to reflect a form that incorporates voltage perturbation:

$$R(I_2, PERT_V) = \frac{\left(V_1 - \frac{PERT_V}{100} V_1\right) I_2 - V_1 I_1}{I_2^2 - I_1^2}, \quad (5)$$

where $PERT_V$ is the voltage perturbation in percent. FIG. 5 shows four voltage perturbations that correspond to 5, 10, 15 and 20 percent, respectively. Initial conditions for the operating point chosen correspond to a line resistance R of about 472 ohms and a power received of about 53.5 watts. Then, $V_1$, equals 395 Volts, $V_2$ equals $(V_1 - V_{PERT})$, and $I_1$, equals 170 milliamperes. The transmission Resistance R, is plotted as a function of the source current $I_2$ observed at the reduced source voltage $V_2$.

The 10 percent source voltage perturbation was selected for use, in the example presented, based on four observations. Compared to the 5 percent source voltage perturbation, it is monotonic in the region of interest. Compared to 15 and 20 percent source voltage perturbations, it allows a wider range of resistance measurements before the current limit value of 250 milliamps is reached. It allows for a significant change in source voltage, which is also a measured value. And, it is a smaller disturbance to the system than the 15 and 20 percent source voltage reductions with regard to power delivered. These general selection criteria may be employed to select an appropriate source voltage perturbation percentage for other applications.

In the illustrated embodiment for the power distribution system 100, the degradation monitoring section 113 may be employed to implement a resistance tracking log that tracks resistance changes over time for each deployed circuit. This provides a ready record of the condition of insulation or wiring deterioration through resistance increase of the wire-pairs. Additionally, the degradation monitoring section 113 may also be employed to track the increase in source current or power needed to maintain a constant load power associated with the wire-pairs thereby indicating a level of deterioration.

Figure 6:
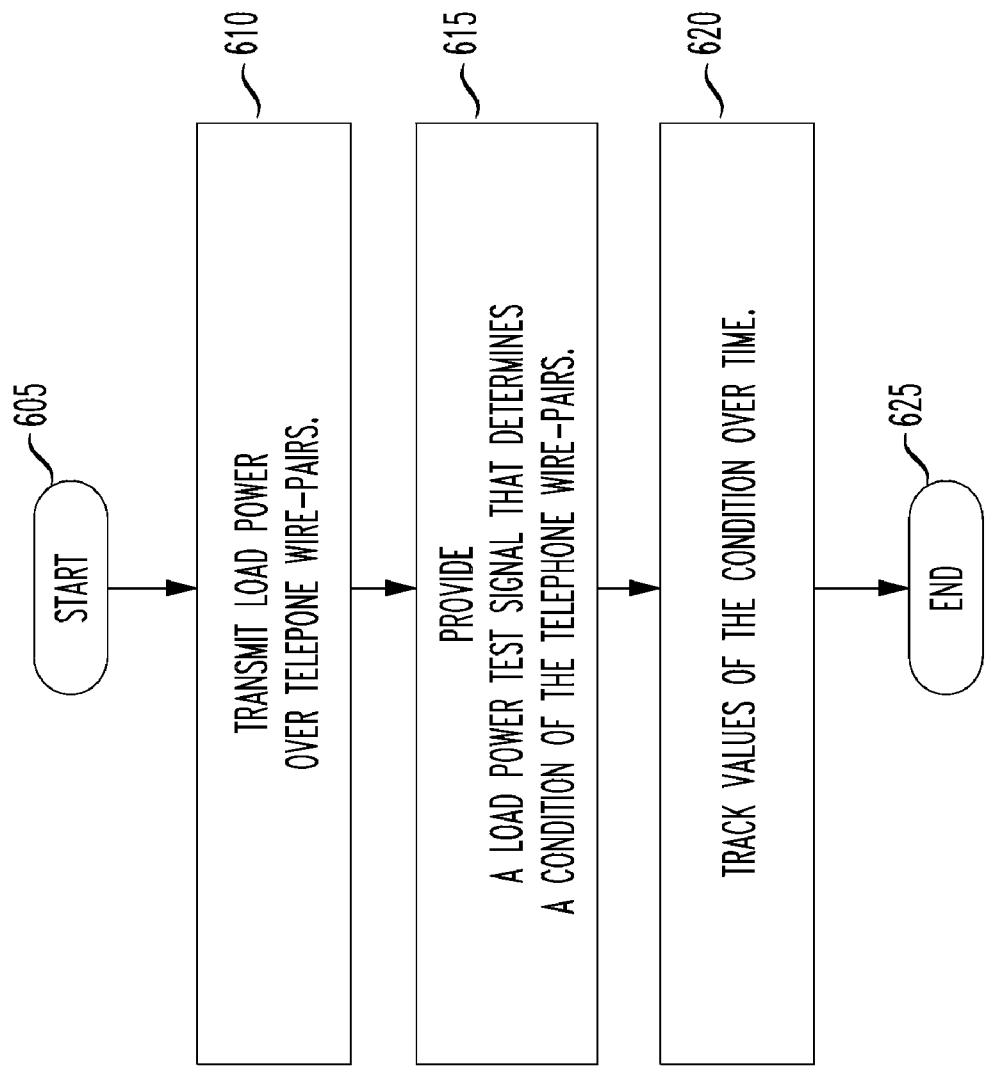
FIG. 6 illustrates a flow diagram of a method of detecting wiring degradation carried out in accordance with the principles of the present invention.

Turning now to FIG. 6, illustrated is a flow diagram of a method of detecting wiring degradation, generally designated 600, carried out in accordance with the principles of the present invention. The method 600 is for use with telephone wire-pairs providing electric power and starts in a step 605. Then, load power is transmitted over the telephone wire-pairs, in a step 610, which may employ multiple wire-pairs for the power transmission. In a step 615, a load power test signal is provided at a source end of the power transmission that determines a condition of the telephone wire-pairs.

Generally, the load power test signal determines the condition of these telephone wire-pairs by providing corresponding transmission resistance and current values associated with conveying power to a load at a remote receiving end. Additionally, the load power test signal provides a substantially constant load power in determining the condition of the telephone wire-pairs.

The load power test signal provides a source perturbation in determining the condition of the telephone wire-pairs. In one embodiment, the source perturbation is a departure in source current. In an alternate embodiment, the load power test signal is a departure in source voltage. A source voltage perturbation of about 10 percent may be employed as a generally acceptable value depending on a telephone wire-pair transmission structure and measurement resolution employed. The method 600 also includes tracking the values of the condition of the telephone wire-pairs over time to determine and catalog their level of degradation. The method 600 ends in a step 625.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps is not a limitation of the present invention.

In summary, embodiments of the present invention employing a wiring degradation detector, a method of detecting wiring degradation and a power distribution system employing the detector or the method have been presented. Advantages include employing a load power test signal that provides a source perturbation having a departure in source current with the ability to determine a deviation from its peers for telephone wire-pairs. This approach provides a context for deterioration by looking at other circuits serving the same node. Deviation from a norm provides a ready reference for gauging response.

Also, for indirect determination of resistance, a source perturbation employing a 10 percent departure in source voltage was seen to provide an appropriately measurable response. The resistance measurement allows a simple book keeping approach wherein tracking changes of a transmission resistance value over time is employed. This may be accomplished by implementing a resistance tracking log to track resistance changes over time for each deployed circuit.

When operating around a region of interest, both approaches provide signal to noise levels consistent with measurement by inexpensive eight-bit analog-to-digital converters deployed at the source end of the power distribution system.

Although the present invention has been described in detail, those skilled in the art should understand that they can make various changes, substitutions and alterations herein without departing from the spirit and scope of the invention in its broadest form.

What is claimed is:

1. A wiring degradation detector for use with telephone wire-pairs providing electric power, comprising:
    a transmission section configured to transmit load power over said telephone wire-pairs via a source current conveyed by a first telephone wire-pair and a return current conveyed by a second telephone wire-pair; and
    a test section coupled to said transmission section and configured to provide a load power test signal that determines a condition of said telephone wire-pairs,
    wherein said first and second telephone wire pairs connect an upstream power converter to a downstream power converter.

2. The detector as recited in claim 1 wherein determining said condition provides corresponding resistance and current values for said telephone wire-pairs.

3. The detector as recited in claim 1 wherein said load power test signal provides a substantially constant load power in determining said condition of said telephone wire-pairs.

4. The detector as recited in claim 1 wherein said load power test signal provides a source perturbation in determining said condition of said telephone wire-pairs.

5. The detector as recited in claim 4 wherein said source perturbation is a departure in source current.

6. The detector as recited in claim 4 wherein said source perturbation is a departure in source voltage.

7. The detector as recited in claim 1 further comprising a degradation monitoring section coupled to said test section and configured to track values of said condition over time.

8. A method of detecting wiring degradation for use with telephone wire-pairs providing electric power, comprising:
    transmitting load power from an upstream power converter to a downstream power converter over said telephone wire-pairs via a source current conveyed by a first telephone wire-pair and a return current conveyed by a second telephone wire-pair; and
    providing a load power test signal that determines a condition of said telephone wire-pairs.

9. The method as recited in claim 8 wherein determining said condition provides corresponding resistance and current values for said telephone wire-pairs.

10. The method as recited in claim 8 wherein said load power test signal provides a substantially constant load power in determining said condition of said telephone wire-pairs.

11. The method as recited in claim 8 wherein said load power test signal provides a source perturbation in determining said condition of said telephone wire-pairs.

12. The method as recited in claim 11 wherein said source perturbation is a departure in source current.

13. The method as recited in claim 11 wherein said source perturbation is a departure in source voltage.

14. The method as recited in claim 8 further comprising tracking values of said condition over time.

15. A power distribution system, comprising:
    an upstream power converter coupled to a power source;
    a wiring degradation detector coupled to said upstream power converter, including:
        a transmission section that transmits load power from said upstream power converter to a downstream power converter over telephone wire-pairs via a source current conveyed by a first telephone wire-pair and a return current conveyed by a second telephone wire-pair,
        a test section, coupled to said transmission section, that provides a load power test signal for determining a condition of said telephone wire-pairs, and
        a degradation monitoring section, coupled to said test section, that tracks values of said condition over time;
    said downstream power converter coupled to said wiring degradation detector; and
    a load coupled to said downstream power converter.

16. The system as recited in claim 15 wherein determining said condition provides corresponding resistance and current values for said telephone wire-pairs.

17. The system as recited in claim 15 wherein said load power test signal provides a substantially constant load power in determining said condition of said telephone wire-pairs.

18. The system as recited in claim 15 wherein said load power test signal provides a source perturbation in determining said condition of said telephone wire-pairs.

19. The system as recited in claim 18 wherein said source perturbation is a departure in source current.

20. The system as recited in claim 18 wherein said source perturbation is a departure in source voltage.

* * * * *